United States Patent [19]

Schwab

[11] Patent Number: 4,569,108
[45] Date of Patent: Feb. 11, 1986

[54] CLOSED LOOP-HOOK AND ELASTIC BAND FASTENER

[76] Inventor: Leonard M. Schwab, 3 Olde Lantern Rd., Acton, Mass. 01720

[21] Appl. No.: 667,963

[22] Filed: Nov. 5, 1984

[51] Int. Cl.⁴ ............................................. F16L 33/00
[52] U.S. Cl. .................... 24/17 R; 24/17 B; 24/17 AP; 24/300; 24/301
[58] Field of Search .......... 24/17 R, 17 A, 17 B, 24/17 AP, 30.5 P, 298, 300, 301, 344, 372, 230.5, 230.5 W, 265 AL, 265 H, 265 AL, 18; 289/1.2

[56] References Cited

U.S. PATENT DOCUMENTS

| | | | |
|---|---|---|---|
| 583,564 | 6/1897 | Benford | 24/301 |
| 913,962 | 3/1909 | Liddy | 24/17 A |
| 1,196,555 | 8/1916 | Lee | 24/18 |
| 1,994,659 | 3/1935 | Mascarenhas | 289/1.2 |
| 2,328,474 | 8/1943 | Lewis | 24/300 |
| 2,656,183 | 12/1953 | Neff | 24/17 R |
| 2,832,358 | 4/1958 | Chambers | 24/301 X |
| 3,657,774 | 4/1972 | Reynolds | 24/298 |
| 4,158,250 | 6/1979 | Ringwald | 24/16 R |
| 4,335,490 | 6/1982 | Teachout | 24/17 B |

Primary Examiner—William E. Lyddane
Assistant Examiner—Peter A. Aschenbrenner
Attorney, Agent, or Firm—Donald W. Meeker

[57] ABSTRACT

A wire is bent into an enclosed loop and double bent at each end to form a quadruple element hook extending from the loop. At least one elasticized loop is attached to the loop-hook by a pull-through knot. Additional elasticized loops may be added and alternated with rigid closed loops as desired. The entirely closed loop system may be used linearly or in a spiderlike fashion to bind external objects. Alignment of the two sides of the elasticized loop with the two sides of the quadruple element hook provides efficient load transfer from hook to elasticized loop. Prebending of the loop-hook opposite the hook further insures alignment.

27 Claims, 9 Drawing Figures

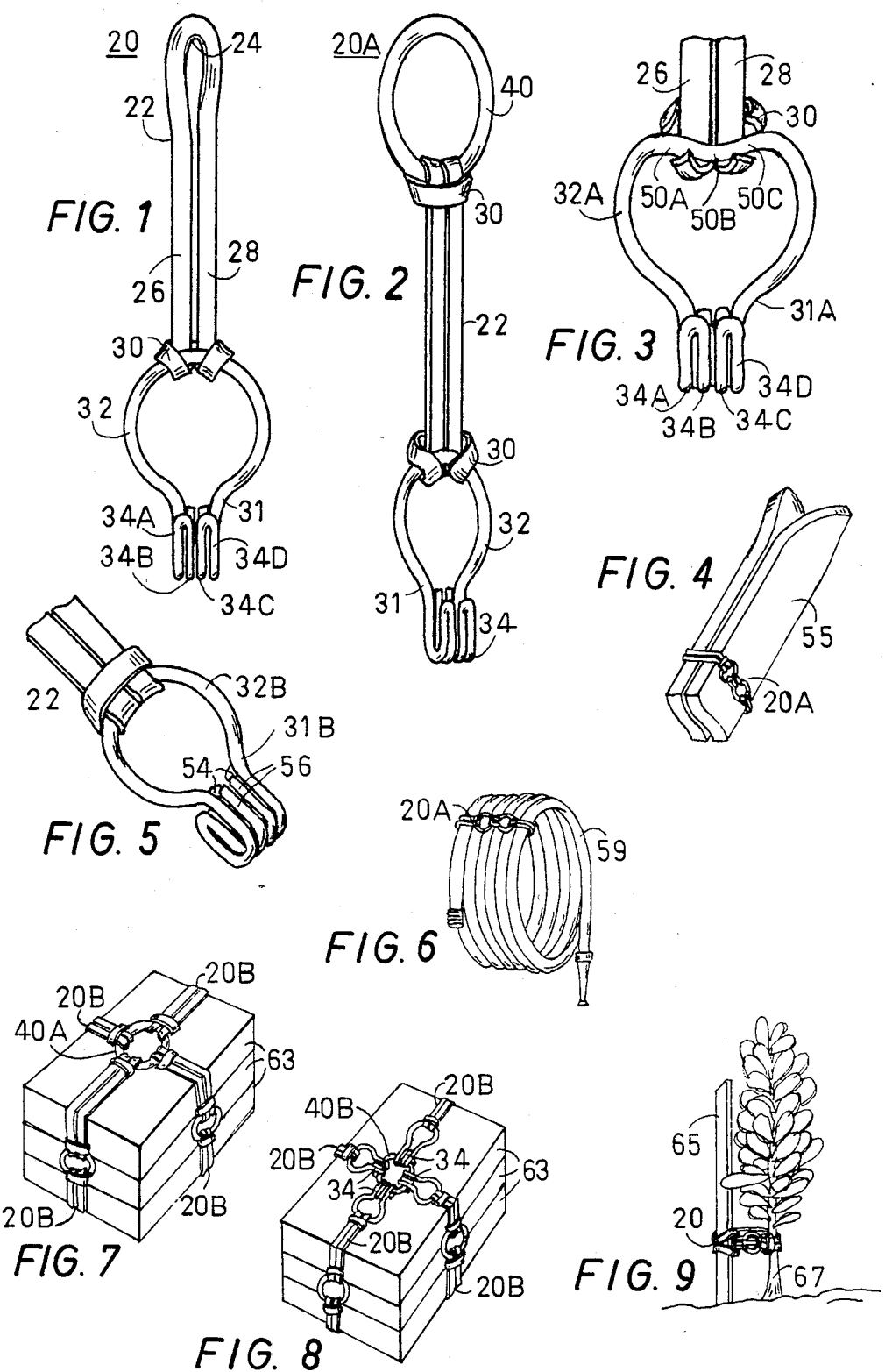

CLOSED LOOP-HOOK AND ELASTIC BAND FASTENER

BACKGROUND OF THE INVENTION

1. Technical Field

The present invention relates to packet holders and binders and in particular to an elasticized expansible strap fastener combining closed loops and hooks with closed loop elastic bands.

2. Background Art

Binding packages and loose articles together requires either a tie device or expansible strap for encompassing diverse articles varying in number and shape or bundles varying in size and shape. If the items to be bound are large in any dimension, or have undefined or ill-defined end points, a simple loop elastic band-type fastener will not fit around. Tie fasteners may come loose or be difficult to untie if bound tightly, and in some cases, when one hand is required for holding articles together while binding, it is impossible to tie a binder requiring two hands unless another person is present to assist.

Some prior art devices exist with hooks interconnected by elastic lines, particularly for attaching goods to bicycles, motorcycles or vehicles in general. These elasticized cords are very thick and bulky themselves, taking up space and not fitting in tightly confined locations. They are also relatively expensive and complex to fabricate with multiple elastic lines bound by fabric and crimped together at the ends by the hooks. This crimped end has a tendency to slip loose under high tension conditions.

Other prior art devices provide inexpensive hooks with loops which may be interconnected by elasticized bands or cords, but typically the hooks are weak single or double thickness members and have a tendency to pull open under high tension.

One prior art device shown in U.S. Pat. No. 913,962 uses closed loop rubber bands in an expansible strap, but then combines them with open loop connectors and open loop-hooks all of which may be pulled apart under high tension and all of which have exposed ends or tips of the wire members forming the loops which may snag or scratch skin, clothes or the articles being bound.

DISCLOSURE OF INVENTION

Combining rigid closed metal or strong plastic loops, hooked at one end, with closed loop elasticized bands fastened to the loops with a simple, yet slip-proof, pull-through knot provides an expansible spanner strap which is easily applied with a simple hook-in action and yet intrinsically slip-proof because all of the components and the knots are closed loops. By stretching the spanner strap up to typically five times its own length or by adding additional elasticized bands or bands and loops it binds together a wide variety of objects including: loose objects such as washers, coiled objects such as hoses, tie-down objects such as covers (barbecue grill cover for example), athletic equipment such as skis and poles, objects to supports such as plants to stakes, or any items to be bound.

A wire hook bent into a flat closed loop with a double bend at the hook end creates a quadruple element hook with greater strength than any other type of loop-hook using the same wire. Combining that loop-hook with a rubber band secured to the loop-hook by a pull-through knot around the loop opposite the hook, wherein the two sides of the rubber band then lie flat in the same plane as the loop with each side in linear alignment with each side of the hook, provides optimum efficiency and strength in transferring the load from the hook to the band. Rounded loops with no sharp bends further optimize load transfer with no weak joints or sharp joints, typically the site of breaks in members. A slight smooth deformation in the loop-hook on the side opposite the hook further insures alignment of the sides of the rubber band with the sides of the hook without weakening the loop-hook. Thereby a very strong yet flat expansible spanner strap is provided, with optimum load bearing capacity for the material and minimum space requirement.

Using all closed loops and a hook with a double bend at the end insures a snag-free and scratch-free spanner strap and rounded hook with no exposed sharp ends, which maintains a physically low profile throughout its length.

Providing hooks simply fabricated of bent wire or loops and hooks of formed wire or plastic creates a very inexpensive fastening system when used with ordinary rubber bands to form expansible flat-lying spanner straps.

Although the natural forces on the hook in action tend to pull the loop-hook tighter together, the ends of the wire forming the hook where they are bent inwardly in the quadruple thickness hook may be soldered to the adjacent outside wires and together improve the hood unbending/opening load limits, to prevent any accidental separation of the loop-hook and smooth the ends.

BRIEF DESCRIPTION OF THE DRAWINGS

These and other details and advantages of my invention will be described in connection with the accompanying drawings, which are furnished only by way of illustration and not in limitation of the invention, and in which drawings:

FIG. 1 is a plan view of the invention comprising a simple rigid loop-hook and elasticized loop;

FIG. 2 is a perspective view of the invention comprising a rigid loop-hook and a rigid loop interconnected by as elasticized loop;

FIG. 3 is a plan view of an alternate embodiment of the loop-hook with a deformation spacing means where the elasticized band connects to the loop-hook by a pull-through knot shown in partial section to reveal the deformation underneath;

FIG. 4 is a perspective view in partial section showing the invention used as a spanner strap to secure a pair of skis;

FIG. 5 is a perspective rear view of the loop-hook with the ends of the wire soldered;

FIG. 6 is a perspective view of the invention in its preferred embodiment used to encircle a coiled hose;

FIG. 7 is a perspective view of an alternate embodiment of the invention used plurally in a spiderlike fashion to bind external objects together;

FIG. 8 is a perspective view of the opposite side of the objects of FIG. 7 showing the hooks of the invention hooked into a central rigid loop;

FIG. 9 is an elevational view of the simple form of the invention used to secure a plant to a stake.

BEST MODE FOR CARRYING OUT THE INVENTION

In FIG. 1 the closed loop-hook and elastic band fastener 20 comprises a loop-hook 31 preferably formed of wire bent into a closed circular loop 32 bent into a quadruple element hook 34 A, B, C and D enclosing one end of the loop. An elasticized loop such as a rubber band 22 is secured to the loop 32 portion opposite the hook by a pull-through knot 30 formed by inserting the rubber band through the closed loop of the loop-hook, drawing the rubber band back over itself and pulling tight on the rubber band until the knot end secures tightly to the loop-hook. Thus secured, the two sides 26 and 28 of the rubber band extend from the loop-hook edge to edge in parallel flat planar alignment with one another and with the plane of the loop-hook. From the viewer's point of view, the left side 26 of the rubber band is in linear alignment with the left side 34 A and B of the hook and the right side 28 of the rubber band is in linear alignment with the right side 34 C and D of the hook, thereby providing optimum efficiency in transferring the load from the hook 34 to the rubber band members 26 and 28. The opposite end of the rubber band forms a receiving loop 24 for the hook 34 in binding the invention 20 around external objects, such as the plant 67 bound to the stake 65 by the invention 20 in FIG. 9.

The loop-hook 31 of FIGS. 1 and 2 may be formed of any rigid material including plastic, but is preferably bent metal wire which is inexpensive and easily formed into shape. Bending each end of the wire back onto itself and then further bending the double thickness ends into an arched hook configuration, a quadruple hook 34 A, B, C and D is formed, which hook together with the integral enclosed loop creates a fastening element of far greater strength than other hooks formed of the same thickness of wire. Furthermore, the loop 32 and base of the hook lie flat in the same plane as the flat rubber band 22 with only the slight bend of the hook 34 elevated, thereby producing an expansible elongated spanner strap which requires very little space and lies flat against objects bound by the strap.

In FIG. 2 one embodiment of the invention 20A comprises an additional closed circular loop 40 formed of metal or plastic and secured to the opposite end of the rubber band by a pull-through knot 30. The rigid circular loop 40 may serve as the receiving end of the strap for the hook 34 or as a means for attaching additional rubber bands alternated with other rigid loops and an end loop-hook to form a strap of any desired length 20B of FIGS. 7 and 8. Expansible spanner strap fasteners 20A may be used for any task requiring binding or fastening including athletic equipment such as skis 55 in FIG. 4 or gathered or coiled objects which may have poorly defined or undefined end points, such as a hose 59 in FIG. 6. The uses are greatly enhanced by the ability to add or delete loop pairs easily as desired.

In FIGS. 7 and 8 one rigid closed loop 40A is used to attach multiple rubber or other elasticized loops forming spanner straps 20B radiating from the central loop 40A outwardly in a spiderlike fashion to encircle and bind any shape external objects 63. A similar rigid closed loop 40B in FIG. 8 is located on an opposite side of the same external object 63 as the other loop 40A, in FIG. 7, to which first loop 40A the ends of the rubber bands are secured by pull-through knots. The second loop 40B receives the opposite ends of all the spanner straps 20B with each hook end 34 of each spanner strap hooked onto the second loop 40B.

In FIG. 3 an alternate embodiment of the loop-hook 31A comprises an additional deformation 50 of the loop 32A to insure alignment of the sides of the rubber band 26 and 28 with the sides of the hook. A concave bend 50B in the loop 32A creates a spacing means with a left arc 50A to maintain the left side of the band 26 in alignment with the left side of the hook 34 A and B, and a right arc 50C to maintain the right side of the band 28 in alignment with the right side of the hook 34 C and D for maximum linear transfer of load between the hook and the band.

In FIG. 5 another alternate embodiment of the loop-hook 31B shown back side up comprises an additional soldering 54 or other adhering means securing the ends of the wire 56 to the outside arms of the hook, and to each other. This soldering improves the hook strength, further insures that the elements of the hook cannot be separated and smoothes over the ends of the wire.

The very flexible fastening system of the invention provides a strong relatively flat hook with a rounded tip formed by the bent-over wire to create a snag-free and scratch-free hooking means to link up with a loop at the opposite end of the highly expansible strap for an adaptable fastening system to meet a wide variety of needs.

It is understood that the preceding description is given merely by way of illustration and not in limitation of the invention and that various modifications may be made thereto without departing from the spirit of the invention as claimed.

I claim:

1. An expansible elongated spanner strap comprising:
   a series of at least two enclosed loops alternately elasticized and rigid, which loops are interconnected by a pull-through knot formed by an elasticized loop engaging a rigid loop with two sides of the elasticized band contacting each other and positioned in parallel planar alignment with each other and with the plane of the rigid loop; and
   at one end of the spanner strap a rigid loop further comprising a hook means extending outwardly from the rigid loop in planar alignment with the rigid loop, which hook removably interlocks with a loop at an opposite end of the spanner strap to form a tensioned bond around at least one object bound by the spanner strap;
   wherein the rigid loop with hook extension comprises a wire bent into an enclosed rigid loop-hook, wherein each of two ends of the wire is bent back into parallel alignment and contact with a segment of the same wire interior to the end to form a double wire end, each of which double wire end is further bent into an arched configuration, and the two arched configurations are further bent into parallel contacting alignment to form a guadruple wire hook enclosing the rigid loop and extending therefrom in linear alignment with the two sides of the elasticized band engaging the opposite of the loop-hook.

2. The invention of claim 1 further comprising in the rigid loop-hook opposite the hook a disconformity in the rigid loop forming a spacing means to maintain the two sides of the elasticized band in linear alignment with the two sides of the hook.

3. The invention of claim 2 wherein the disconformity in the rigid loop comprises a single indentation of the loop inwardly in the direction of the center of the loop at a point directly opposite to the hook thereby positioning each of the two sides of the elasticized band one on each side of the indentation yet still contacting each other as they extend from the rigid loop.

4. The invention of claim 1 wherein the wire of the hook is bonded together.

5. The invention of claim 1 wherein the series comprises multiple closed elasticized loops engaging by similar pull-through knots one closed rigid loop between each pair of elasticized loops to form a linear expansible chainlike structure.

6. The invention of claim 1 wherein a single closed circular rigid loop is engaged by at least three elasticized loops extending from the circular rigid loop in multiple directions, each extending strap with its own loop-hook at each outer end to engage a second circular rigid loop thereby encircling and binding at least one object on multiple sides.

7. The invention of claim 1 wherein the rigid loop is formed of bent wire and the elasticized loop comprises a rubber band.

8. A closed loop fastening system comprising:
at least one rigid closed loop-hook comprising a flat closed loop of rigid elongated material formed into a loop structure having a hook extending from a side of the loop with the connecting base of the hook formed of multiple contacting thicknesses of the elongated material in flat parallel alignment coplanar with the loop and a bent end of the aligned material forming a rigid hook;
at least one closed elasticized loop engaging the closed loop-hook at a side of the loop-hook opposite the hook wherein the elasticized loop engages the closed loop-hook by means of a pull-through knot in the elasticized loop around the side of the loop-hook with two sides of the elasticized loop approximately contacting each other and extending from the loop-hook in parallel planar alignment with each other and with the hook;
wherein the elasticized loop is stretched around at least one object external to the fastening system and the hook removably engages the loop at an end of the elasticized band opposite to the hook thereby forming a tensioned bond around the object;
and wherein the rigid loop with hook extension comprises an elongated member formed into an enclosed rigid loop-hook, wherein each of two ends of the elongated member bends back into parallel alignment and contact with a segment of the same elongated member interior to the end to form a double thickness end, each of which double thickness ends bends further into an arched configuration, and the two arched configurations bend further into parallel contacting alignment to form a quadruple thickness hook enclosing the rigid loop and extending therefrom in linear alignment with the two sides of the elasticized band engaging the opposite side of the loop-hook.

9. The invention of claim 8 wherein the elongated member comprises a length of plastic material.

10. The invention of claim 8 wherein the elongated member comprises a length of wire.

11. The invention of claim 8 further comprising in a side of the rigid loop-hook opposite the hook a disconformity in the rigid loop-hook forming a spacing means to maintain the two sides of the elasticized band in linear alignment with the two sides of the hook.

12. The invention of claim 11 wherein the disconformity in the loop-hook comprises a single indentation of the rigid loop inwardly in the direction of the center of the loop at a point directly opposite to the hook thereby positioning each of the two sides of the elasticized band one on each side of the indentation yet still contacting each other as they extend from the rigid loop-hook.

13. The invention of claim 8 wherein a closed rigid loop is engaged to an end of the elasticized loop opposite to the end engaged by the loop-hook by a similar pull-through knot in the opposite end of the elasticized loop, and the hook engages the rigid loop when in place around the object.

14. The invention of claim 8 further comprising a series of closed elasticized loops extending linearly from the loop-hook wherein each adjacent pair of elasticized loops engages a rigid closed loop therebetween by means of similar pull-through knots to form a linear expansible chainlike structure.

15. The invention of claim 8 wherein a single closed circular rigid loop is engaged by at least three elasticized loops extending from the circular loop in multiple directions forming a spiderlike configuration of expansible lines each terminating in a rigid loop-hook which each removably engage a second rigid circular closed loop or receiving opening, thereby encircling at least one external object on multiple sides.

16. The invention of claim 8 wherein the rigid loop-hook is formed of bent wire and the elasticized loop comprises a rubber band.

17. The invention of claim 8 wherein the elongated material of the hook is bonded together.

18. A closed loop fastener comprising:
at least one rigid closed loop-hook comprising a wire bent into an enclosed rigid loop, wherein each of two ends of the wire is bent back into parallel alignment and contact with a segment of the same wire interior to the end to form a double wire end, each of which double wire ends is further bent into an arched configuration, and the two arched configurations are further bent into parallel contacting alignment to form a quadruple wire hook enclosing the rigid loop and extending therefrom;
wherein at least one closed loop rubber band is engaged to the loop-hook by a pull-through knot around a side of the rigid loop-hook opposite the hook;
and wherein the rubber band is stretched around at least one external object and the hook removably connected to a loop at an end of the rubber band opposite to the hook.

19. The invention of claim 18 wherein the wires of the hook are bonded together.

20. The invention of claim 18 further comprising in the loop-hook on the side of the loop-hook opposite the hook a disconformity in the loop-hook forming a spacing means to maintain two sides of the rubber band extending from the loop-hook in linear alignment with the two sides of the hook.

21. The invention of claim 18 further comprising a series of rubber bands extending linearly from the loop hook wherein each adjacent pair of rubber bands engages a rigid closed loop therebetween by means of pull-through knots to form a linear expansible chainlike structure.

22. An expansible elongated spanner strap comprising:

a series of at least two enclosed loops alternately elasticized and rigid, which loops are interconnected by a pull-through knot formed by an elasticized loop engaging a rigid loop with two sides of the elasticized band contacting each other and positioned in parallel planar alignment with each other and with the plane of the rigid loop; and at one end of the spanner strap a rigid loop further compising a hook means extending outwardly from the rigid loop in planar alignment with the rigid loop, which hook removably interlocks with a loop at an opposite end of the spanner strap to form a tensioned bond around at least one object bound by the spanner strap;

wherein the rigid loop with hook extension comprises an elongated member formed into an enclosed rigid loop-hook, wherein each of two ends of the elongated member bends back into parallel alignment and contact with a segment of the same elongated member interior to the end to form a double thickness end, each of which double thickness ends bends further into an arched configuration, and the two arched configurations bend further into parallel contacting alignment to form a quadruple thickness hook enclosing the rigid loop and extending therefrom in linear alignment with the two sides of the elasticized band engaging the opposite side of the loop-hook.

23. The invention of claim 22 wherein the elongated member comprises a length of plastic material.

24. The invention of claim 22 wherein the elongated member comprises a length of wire.

25. A closed loop fastener comprising:
at least one rigid closed loop-hook comprising an elongated member formed into an enclosed rigid loop, wherein each of two ends of the elongated member bends back into parallel alignment and contact with a segment of the same elongated member interior to the end to form a double thickness end, each of which double thickness ends bends further into an arched configuration, and the two arched configurations bend further into parallel contacting alignment to form a quadruple thickness hook enclosing the rigid loop and extending therefrom;

wherein at least one closed loop rubber band is engaged to the loop-hook by a pull-through knot around a side of the rigid loop-hook opposite the hook;

and wherein the rubber band is stretched around at least one external object and the hook removably connected to a loop at an end of the rubber band opposite to the hook.

26. The invention of claim 25 wherein the elongated member comprises a length of plastic material.

27. The invention of claim 25 wherein the elongated member comprises a length of wire.

* * * * *